United States Patent
Antonuzzo

(10) Patent No.: US 12,330,440 B2
(45) Date of Patent: Jun. 17, 2025

(54) PRINTED BOOK PRODUCTION PLANT WITH DIGITAL TECHNOLOGIES WITH ONE OR MORE BOOK BLOCK FORMING STATIONS AND ONE OR MORE COVER BINDING MACHINES AND RELATED METHOD

(71) Applicant: S.E.M. Servizi Editoriali Milano S.P.A., Milan (IT)

(72) Inventor: Giovanni Antonuzzo, Milan (IT)

(73) Assignee: S.E.M. Servizi Editoriali Milano S.P.A.

( * ) Notice: Subject to any disclaimer, the term of this patent is extended or adjusted under 35 U.S.C. 154(b) by 0 days.

(21) Appl. No.: 18/574,465

(22) PCT Filed: Jun. 27, 2022

(86) PCT No.: PCT/EP2022/067586
§ 371 (c)(1),
(2) Date: Dec. 27, 2023

(87) PCT Pub. No.: WO2023/274968
PCT Pub. Date: Jan. 5, 2023

(65) Prior Publication Data
US 2024/0308261 A1    Sep. 19, 2024

(30) Foreign Application Priority Data
Jun. 28, 2021   (IT) .................. 102021000016826

(51) Int. Cl.
*B42C 11/04*    (2006.01)
*B42C 1/12*     (2006.01)
*B42C 19/08*    (2006.01)

(52) U.S. Cl.
CPC ............. *B42C 1/12* (2013.01); *B42C 11/04* (2013.01); *B42C 19/08* (2013.01); *B65G 2207/24* (2013.01)

(58) Field of Classification Search
CPC ...... B42C 11/04; B42C 19/08; B65G 2207/24
(Continued)

(56) References Cited

FOREIGN PATENT DOCUMENTS

EP          2 269 823 A1      1/2011

OTHER PUBLICATIONS

International Search Report and Written Opinion—PCT/EP2022/067586—mailing date Sep. 26, 2022.

*Primary Examiner* — Kyle R Grabowski
(74) *Attorney, Agent, or Firm* — Banner & Witcoff, Ltd.

(57) ABSTRACT

A production plant (22) for books (23) printed with digital technologies, comprising one or more forming stations (26) of book blocks (32), one or more cover binding machines (27) for assembling the book blocks with respective covers (33), an electronic center (29) and a plurality of spiral towers (39) for accommodating the book blocks of the forming stations and transfer them to the binding machines. The book blocks and the covers have respective book codes (34) and cover codes (36) uniquely associated with the respective books of a given working order. Each tower (39) includes a conveyor belt (42) that can be moved along a spiral path, a belt motorization group and an electronic control unit (44). The towers serve as a temporary storage for the blocks and capacity of movement between loading areas (49) adjacent to the forming station and unloading areas (50) adjacent to the binding machines. The electronic control units (44) pre-set the towers to store in an optimized way along the conveyor belt the book blocks from the forming stations, to supply the binding machines with the stored book blocks and to form and memorize databases identifying the stored (Continued)

book blocks. The electronic center (29) of the plant is interfaced with the electronic control units (44) of the towers and with the binding machines for a survey of the loading data and for a functional coupling of the loaded towers with the binding machines.

14 Claims, 9 Drawing Sheets

(58) Field of Classification Search
USPC .................................................. 198/778
See application file for complete search history.

PRINTED BOOK PRODUCTION PLANT WITH DIGITAL TECHNOLOGIES WITH ONE OR MORE BOOK BLOCK FORMING STATIONS AND ONE OR MORE COVER BINDING MACHINES AND RELATED METHOD

CROSS-REFERENCE TO RELATED APPLICATIONS

This application is a U.S. National Stage application under 35 U.S.C. § 371 of International Application PCT/EP2022/067586 (published as WO 2023/274968 A1), filed Jun. 27, 2022, which claims the benefit of priority to Application IT 102021000016826, filed Jun. 28, 2021. Each of these applications is hereby incorporated by reference in its entirety for all purposes.

FIELD OF THE INVENTION

The present invention relates to a printed book production plant with digital technologies comprising one or more book block forming stations and one or more cover binding machines and to a related method. The present invention relates to a printed book production plant with digital technologies comprising one or more block forming stations the book and one or more binding machines for assembling the book blocks with respective covers and the relative method.

More specifically, the invention relates to a plant and a method for producing printed books using digital technologies, in which the plant comprises one or more book block forming stations, one or more cover binding machines for assembling the book blocks with respective covers and accumulation and transport means for receiving the book blocks provided by the forming stations and transferring them to the binding machines, and wherein the book blocks have corresponding book graphic codes and the covers have respective cover codes univocally associated with the respective book codes according to the introductory part of the main claims.

BACKGROUND OF THE INVENTION

Typically, a book comprises a plurality of sheets with the text pages constituting a book block, and a cover superimposed on the first and last sheets and the rib of the book block. In unbound or paperback books, the assembly of the book blocks with the respective covers is carried out by perfect binders set for the series bonding of the ribs of the book blocks to the spines of the covers. In bound books, the assembly of the book blocks with the covers is carried out by cashing machines.

With the progress of laser or ink jet printing techniques and the use of flexible-setting perfect binders, it has been possible to print on-demand books, allowing the production, at low costs, of books in very limited quantities or with single copy. An example of a book packaging system on demand with production of book blocks and covers and their assembly is represented by the European patent EP 2 269 823.

The productions of on-demand book to be economically competitive require that the plants use a limited amount of manpower and in which the book block forming stations and the perfect binders or more generally the cover binding machines, which represent the most expensive components of the plant, can operate in an optimized manner with very limited dead times, especially during periods of maximum production.

The book block forming stations produce, for example, printed book blocks with digital technologies using a printing line starting from a printed paper roll or from a non-printed paper roll and subsequent printing, with following cutting and stacking of sheets or signatures. For the production of books, the forming stations can be connected to the perfect binders or to the cover binding machines either on-line or off-line, both with problems.

In the on-line connection, such as for example in the plant of the patent EP 2 269 823, a book block forming station and a perfect binder operate in synchronism. The functional speed of the system is the one of the slowest component and the stopping of one of the components causes the stopping of the entire plant.

The effects of stops or delays in the book block forming station or in the perfect binder can be attenuated by providing a buffer transport between the two components. An example of this solution is known from U.S. Pat. No. 8,789,681, in which a two-plane transport table with buffer function is inserted between two book block forming stations and a perfect binder. This structure allows the decoupling between the printing line and the binder, but the plant can continue to operate only for rather limited periods of time, for example during stops due to a replacement of the paper roll in the printing line or a change in the type of cover in the perfect binder.

In the off-line connection between book block forming station and binding machine, the book blocks of the forming stations are sequentially collected on pallets and extracted from the pallets in a suitable manner to be transferred to the binders. The operations of loading and unloading the book blocks are very critical for the intrinsic compliance of the blocks and difficulty of the book blocks being drawn from below or from above.

Moreover, such operations require either a lot of manpower in the case of manual operations and/or the use of expensive robots in the case of automated operations.

SUMMARY OF THE INVENTION

An object of the invention is to provide a system and method for producing printed books with digital technologies which use one or more book block forming stations and one or more perfect binders or sheers for assembling the book blocks with respective covers, which are completely uncoupled, of relatively low cost, allowing a great operating flexibility, with very limited dead times and requiring a small amount of manpower.

In accordance with this object, the plant accumulation and transportation means comprise a plurality of spiral towers, wherein each tower has a conveyor belt that can be moved along a multi-level spiral path, a belt moving group and an electronic control unit for the motorization group. Each tower has a function of temporary storage for the book blocks along the spiral path and capability of movement between loading areas adjacent to the forming stations and unloading areas adjacent to the cover binding machines and in which the electronic control units, in the loading areas, set up the towers for receiving and storing in an orderly way along the conveyor belt the book blocks from the forming stations, while, in the unloading areas, the electronic units set up the towers for feeding the cover binding machines with the stored book blocks. The electronic control units are provided for obtaining and storing databases of identification for the stored book blocks; and the plant has an electronic center, interfaced with the electronic control units of the spiral towers and the cover binding machines for taking charge loading data and for a functional coupling of the loaded towers with the cover binding machines jointly with the working order.

According to another feature, the accumulation and transport means comprise a plurality of spiral towers and in which each tower includes a conveyor belt that can be moved along a spiral path, a belt motorization group and an electronic control unit for the motorization group. Each spiral tower has the function of a temporary storage for the book blocks along the spiral path and capability of movement between a loading area adjacent to the forming station or each forming station and an unloading area adjacent to the cover binding machine or each cover binding machine and in which, in the loading area, the tower is designed for serially receiving and storing the book blocks from the forming station while, in the unloading area, the tower is designed for feeding the cover binding machine with the stored book blocks. The electronic control unit, on the basis of a loading program, responds to information from the forming station and information on dimensional characteristics of a book block emerging from said station for driving the belt motorization group with movement of the conveyor belt such as to arrange the book blocks in an optimized way along the spiral path of the belt, regardless of the size and the time of formation of the book block; and in which the electronic control unit, on the basis of an unloading program, responds to information from the cover binding machine and information on the characteristics of an emerging book block for moving the conveyor belt so as to feed said binding machine with the emerging book block.

In accordance with a further feature, the invention relates to a spiral tower for graphic blocks in a book production plant, in which the tower is used for storing, along a spiral path, graphic blocks of different sizes emerging from a block forming station, The tower has the capability of movement between a loading area of the plant adjacent to the block formation station and an unloading area. An initial section of the spiral path is designed for serially receiving and storing the graphic blocks from the forming station while, in the unloading area, the tower is set up for unloading the graphic blocks from the spiral path towards an user apparatus. An electronic control unit of the tower responds to information on the graphic block emerging from the forming station to drive a motorization group with movement of the conveyor belt such as to arrange the graphic blocks in an optimized way along the spiral path regardless of the size of the graphic blocks and from the time of formation of the blocks.

A plant of these typologies ensures a high production flexibility, with minimum manpower engagement and very limited dead times for the forming stations and for the cover binding machines.

The method of producing books printed with digital technologies of the invention employs a plant comprising one or more book block forming stations, one or more cover binding machines and accumulation and transport means between the forming stations and the cover binding machines. Book blocks and covers have book graphic codes and cover codes associated univocally in a given working order. The accumulation and transport means comprise a plurality of spiral towers, in which each tower has a conveyor belt, a belt moving group and an electronic control unit and capability of movement between loading areas adjacent to the forming stations and unloading areas adjacent to the cover binding machines, while the plant has an electronic center interfaced with the electronic control units of the towers and with the binding machines. The production method comprises in particular the steps:

a) setting up for loading a tower in the loading area, by connecting the input tower with an output from the forming station and interfacing the electronic control unit with the forming station and the server;
b) receiving a book block to be loaded at the input of the tower and, through the optical detection devices, detecting information on characteristics of the book block with transmission to the electronic control unit and updating of the database;
c) activating, via the electronic control unit and on the basis of a loading program, the belt motorization group for moving the conveyor belt so as to arrange the book blocks in an optimized way along the conveyor belt independent of the size of the block book;
d) repeating steps b) and c) until completing the loading of the book blocks on the conveyor belt of the tower and setting up an empty tower already present in the loading area for loading or moving to the loading area an empty tower from the parking area or from the unloading area;
e) moving the loaded tower present in the loading area to the unloading area or the parking area;
f) setting up a full tower present in the unloading area for unloading, by connecting the tower output with an input of the cover binding machine and interfacing the electronic control unit with the binding machine to exchange information;
g) activating, via the electronic control unit and on the basis of an unloading program, the belt motorization group for moving the conveyor belt in order to feed the cover binding machine with the book block removed from the belt.
h) repeating step g) until completing the unloading of the book blocks from the tower and setting up a full tower already present in the unloading area for unloading or moving it from the parking area or the loading area; and
i) moving the emptied tower present in the unloading area to the loading area or the parking area.

DESCRIPTION OF THE DRAWINGS

The characteristics of the invention will become clear from the following description, given as a non-limiting example, with reference to the attached drawings, in which.

DETAILED DESCRIPTION OF THE PREFERRED EMBODIMENTS

Figure 1:
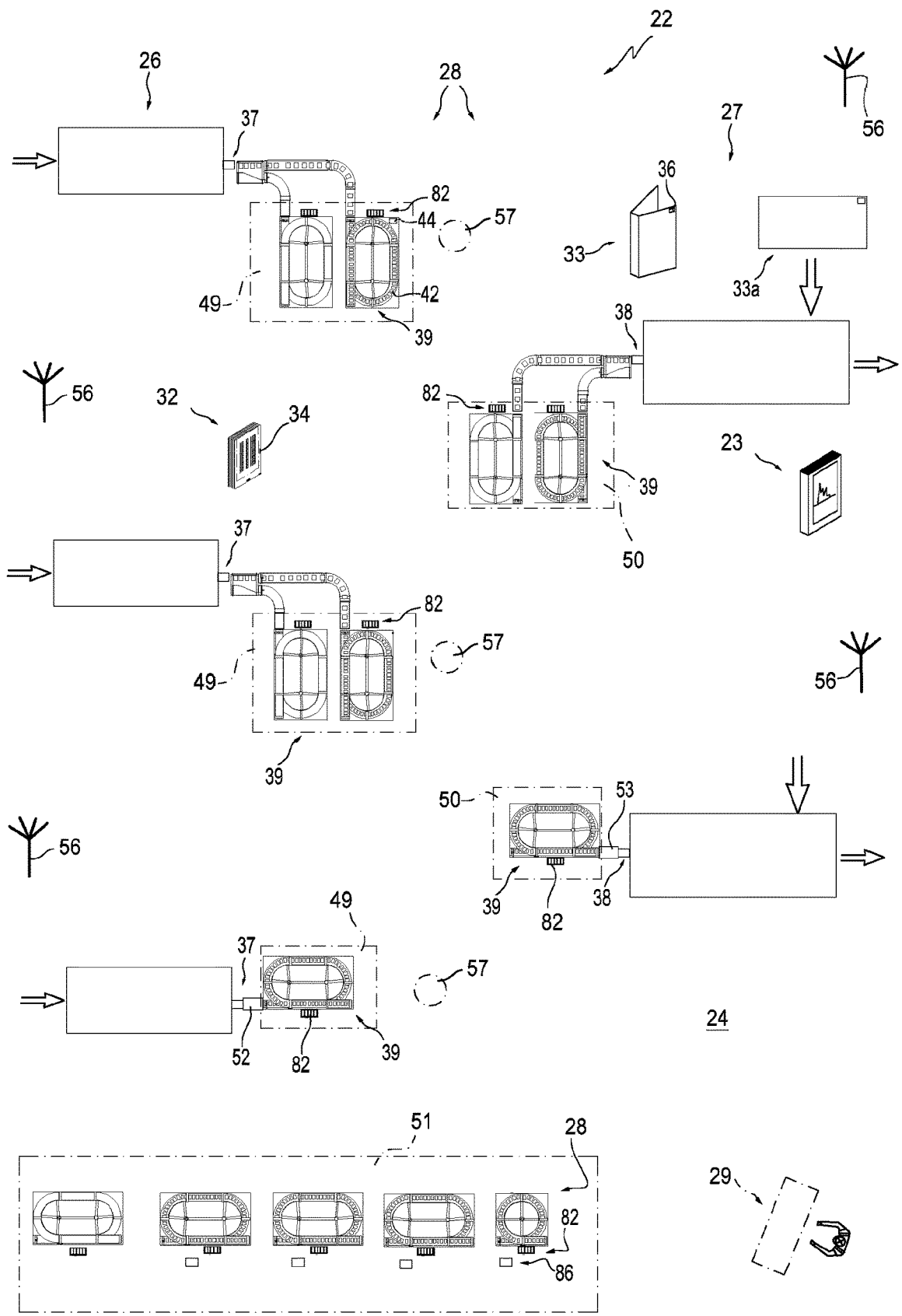
FIG. 1 represents a schematic plan view of a printing-book production plant with digital technologies according to the invention.

With reference to FIG. 1, 22 represents a production plant for books 23 printed with digital technologies, comprising an industrial space 24 for book block forming stations 26, perfect binders 27 for book block covers, with trilateral trimmers (not shown), accumulation and transport means 28 and an electronic center 29.

As far as the present invention is concerned, the book block forming stations 26 and the perfect binders 27 with the trimmers can be of the type described in the aforementioned patent EP 2 269 823, the contents of which are incorporated herein and the description of which is omitted.

The production plant 22 may comprise formation stations for book blocks to be bound of a different type and also stations for forming sewn book blocks and in which the cover binding machines are constituted by cashing machines for hardcover books. From here on, without departing from the scope of the invention, reference will be made only to formation stations for book blocks with single sheets or signatures, to be assembled by means of perfect binders with the respective covers.

In the production plant 22, each book 23 is produced on demand according to a given working order represented by a single identification number and comprises a book block 32 and a cover 33 obtained from a cover sheet 33a. The book block 32 and the cover 33 are identified by a graphic book code 34 and, respectively, by a graphic cover code 36, such as an optically readable Barcode or Data Matrix. The book code 34 includes book-specific information and dimensional information thereof, while the cover code 36 includes data of matching with the respective book block.

The book block forming station 26, as in the patent EP 2 269 823, comprises a high-speed printer fed by a spool of blank paper and wherein, on the basis of the working order and a file with book-specific data, the printer performs printing of the sheets. The sheets are then separated and stacked by corresponding cutting and stacking devices of the book block forming station and then fed through an output gate 37. Naturally, for book blocks formed by superimposed signatures, the cutting device separates the constituent sheets of the signatures, while the book block forming stations 26 have devices for folding such sheets.

Inter alia, the production plant 22 may provide book block forming stations without printers. In this alternative, the forming stations are fed by paper rolls in which the sheets of the book blocks regarding the various working orders have been previously printed in sequence. The book block forming stations therefore have only cutting devices, or cutting and bending devices for the signatures, and stacking and forwarding devices.

According to a known technique, the perfect binders 27 receive the book blocks 32 from an input gate 38, deposit a layer of glue on a rib of the received blocks and assemble the book blocks with the cover 33 obtained by folding of the cover sheet 33a. After drying the glue, the book 23 is trimmed by a trilateral trimming machine and forwarded for palletizing and transport in accordance with the working order. The cover sheets 33a are generally obtained, by cutting, from reels printed with their respective contents and arranged in a sequence according to the working order for a coupling consistent with the sequence of the book blocks received from the forming station 26.

The accumulation and transport means 28 are provided for accommodating the book blocks 32 emerging from the output gates 37 of the forming stations 26 and suitably transferring the received blocks 32 to the input gate 38 of the perfect binders 27.

Figure 2:
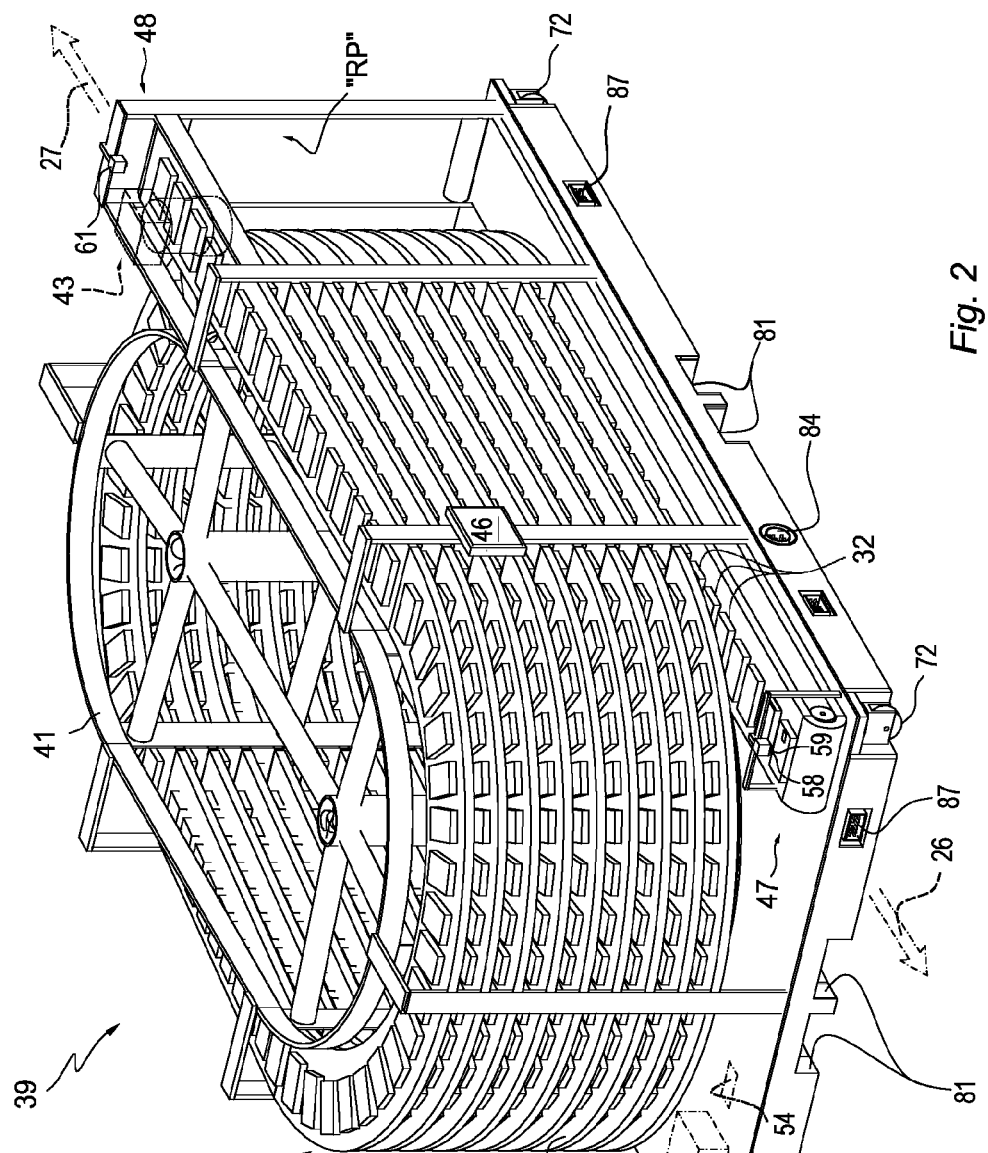
FIG. 2 is a schematic view of a component of the plant of FIG. 1.
Figure 4:
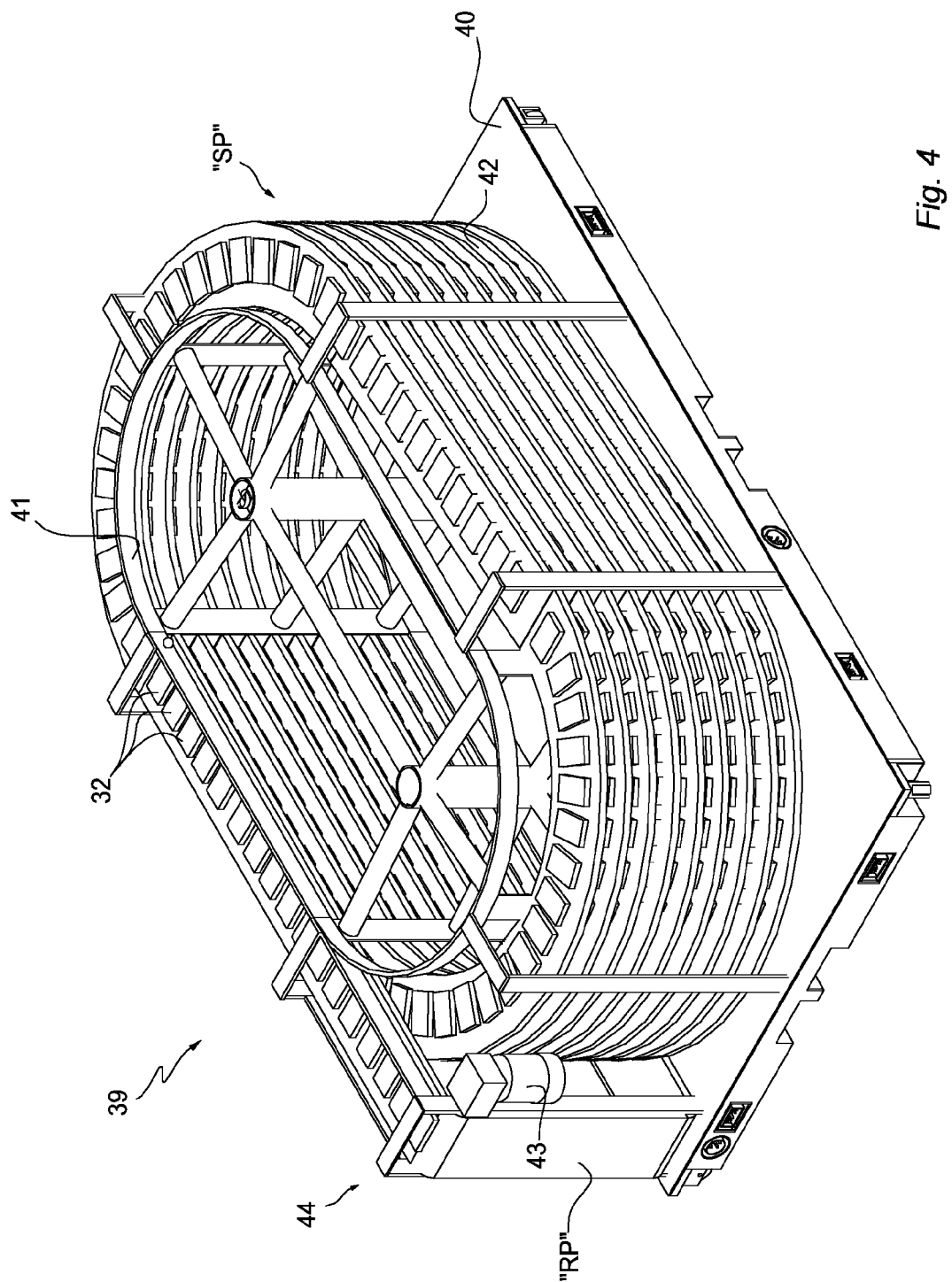
FIG. 4 is another schematic view of the component of FIG. 2.

According to the invention, the accumulation and transport means 28 comprise a plurality of spiral towers 39 (FIGS. 2 and 4) and in which each tower has a platform 40, a support structure 41, a conveyor belt 42, a motorization group for the conveyor belt comprising a motor 43, an electronic control unit 44 and a display 46.

The support structure 41 defines, for the conveyor belt 42, a spiral path "SP" with multiple levels and a recovery path "RP". The conveyor belt 42 can be moved along the spiral path "SP" from an initial section defining a tower input 47 in a lower portion of the path to a terminal section 48 in a higher portion of the path. The recovery path "RP" (shown only in part) of the conveyor belt 42 comprises a vertical portion which descends from the terminal section 48 and a horizontal portion which is directed toward the tower input 47. Generally, the terminal section 48 of the path "SP" also represents an output for the book blocks 32 emerging from the tower 39.

Each spiral tower 39 has a function of temporary storage for the book blocks 32 along the spiral path "SP" and capability of movement in the industrial space 24 between loading areas 49 (see FIG. 1) adjacent to the book block forming stations 26, unloading areas 50 adjacent to the perfect binders 27 and a parking area 51.

Intermediate conveyor belts 52 and intermediate conveyor belts 53, respectively, are also provided for transferring the book blocks 32 between the forming stations 26 and the towers 39 and between the towers and the binders 27 to compensate for the different heights from the ground between the output gates 37 of the book block forming stations 26 and of the tower inputs 47 and between the outputs of the towers 39 and the input gates 38 of the binders 27.

Conveniently, each spiral tower 39 comprises an RFID tag 54, while the plant 22 comprises a series of antennas 56 and ports 57 located in significant areas in the space 24 and connected to the electronic center 29. An operator of the electronic center 29 therefore has the possibility of knowing the position of each tower 39 with respect to the areas 49, 50 and 51.

In the loading areas 49, the spiral towers 39 can be connected to the forming stations 26 for requesting the forwarding of book blocks 32 on the output gates 37. In turn, the electronic control units 44 are programmed for enabling the towers 39 to receive the book blocks 32 serially and store them in an optimized manner along the conveyor belt 42. Moreover, the electronic units 44 are provided for forming and storing databases identifying the stored book blocks.

In the unloading areas 50, the spiral towers 39 can be connected to the perfect binders 27 for forwarding, on request, the stored book blocks 32, while the electronic units 44 pre-set the towers to feed the binders 27 with the book blocks stored for their processing and updating the respective database.

By means of an appropriate organization and an adequate quantity, the spiral towers 39 therefore ensure operations, without downtime, of the book block forming stations 26 and the perfect binders 27.

The book block forming stations 26 operate in fact with a forwarding rhythm of the book blocks 32 strongly variable depending on the number of sheets which constitutes the block: High rhythm for book blocks with reduced number of sheets and progressively lower rhythm for book blocks with high number of sheets. On the other hand, the perfect binders 27 have working times which are substantially independent of the number of sheets of the book blocks to be bound. Moreover, both the book block forming stations and the perfect binders can be subjected to temporary stops, with consequent shutdown of the plant.

The towers 39 are designed for storing without stopping the book blocks formed by the stations 26 and, at different times, for feeding the perfect binders 27 with the stored book blocks, according to their specific rhythm, compensating for the different velocities and temporary stops.

Conveniently, the spiral towers 39 comprise one or more respective detection devices for obtaining identification data of the book blocks 32 received and to be delivered. To this end, at the tower input 47 there is provided a portal provided with an optical reader 58 for reading the book code 34 and with a three-dimensional scanner 59 and relative controllers for determining dimensional and identification information of the received book blocks 32. The terminal section 48 in turn provides a portal with an optical reader 61.

For some configurations of the production plant 22, the spiral towers 39 operate in a direct mode. The unloading of the book blocks is carried out by moving the conveyor belt 42 in the same direction as the loading, according to output logic "FIFO", through the terminal section 48 which defines an output of the tower. The optical reader 61 detects the identification data of the book block 32 present in the terminal section 48 for delivery to the input gate 38 of the perfect binder 27 after checking of the correct matching with the cover code 36 of the book to be produced.

For other configurations of the system 22, the towers 39 operate in an inverted mode. The blocks are unloaded by moving the belt 42 in the direction opposite to the loading direction, according to output logic "LIFO", through the tower input 47. This configuration enables the book blocks to be delivered to the perfect binders at a reduced height with respect to the ground, allowing to use spiral towers of relevant height, without the need for compensatory transport connections between the outputs of the towers and the input gates 38 of the binders. As for the inverted mode, the identification data of the book blocks 32 to be delivered to the binder 27 are consequently obtained by the optical reader 58 of the tower input 47.

In the production plant 22, the electronic center 29 is connected to the book box forming stations 26 and to the perfect binders 27 and includes a server interfaced through a Wi-Fi network with the control units 44 of the spiral towers 39 for a survey of the loading data and for a functional coupling of the towers loaded with the binders 27. This is in accordance with a given working order, for example read from a data file sent to the binder. Moreover, the electronic center 29 is interfaced with the electronic management network of the plant in order to obtain in real time the data of the production and the content of the various towers 39 with the relative data.

Each spiral tower 39 provides for the electronic unit 44 an "LP" loading optimization program, with which the electronic unit is configured in response to reading the book code 34 and dimensional scanning, forming a file containing the working order data, marked by a unique customer code and loading the display 46 with work information and the total quantity of books that the tower can store.

In accordance with the "LP" program and in response to receipt of a book block 32 on the conveyor belt 42 and to information from the optical reader 58 and the three-dimensional scanner 59, the electronic unit 44 drives the motorization group so as to arrange the book blocks 32 along the conveyer belt 42 with optimized spacing. The book blocks can be arranged at a short distance from each other, or scaled with partial overlap, when this is possible compatibly with the thickness of the book blocks and the distance between the coils of the spiral path "SP".

The movement of the conveyor belt 42 is intermittent and at high speed, independent of the delivery rate of the book block forming station 26 and can continue until the detection of a book block at the terminal section 48, indicating the completion of the loading, with a consequent stop command of the belt 42.

In accordance with an "UP" unloading program, the electronic control unit 44 of the tower 39, upon request of the perfect binder 27, responds to the information from the book code 34 of the book block 32 to be bound and, in a slave mode after confirmation, moves the conveyor belt, forwarding the book block for delivery. In addition, the electronic unit 44 updates the database of the stored book blocks and the display 46 with the updated information until the last book block 32 has been delivered and the conveyor belt 42 is arrested.

Figure 5:
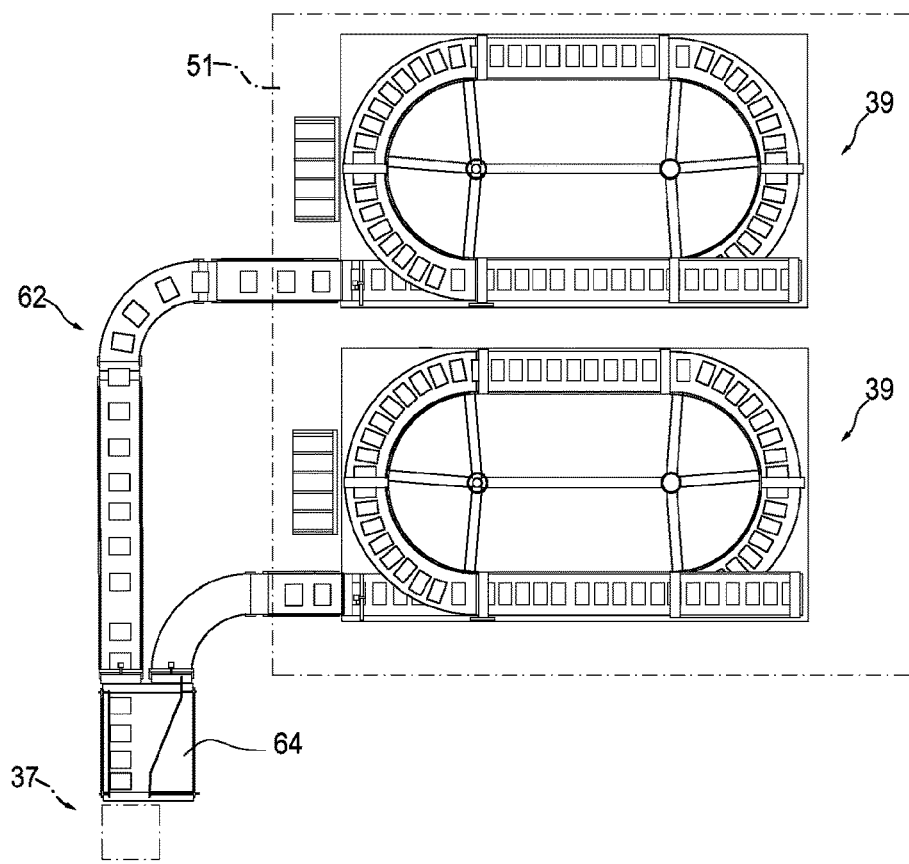
FIG. 5 shows a schematic plan view of some components of the plant of FIG. 1.
Figure 6:
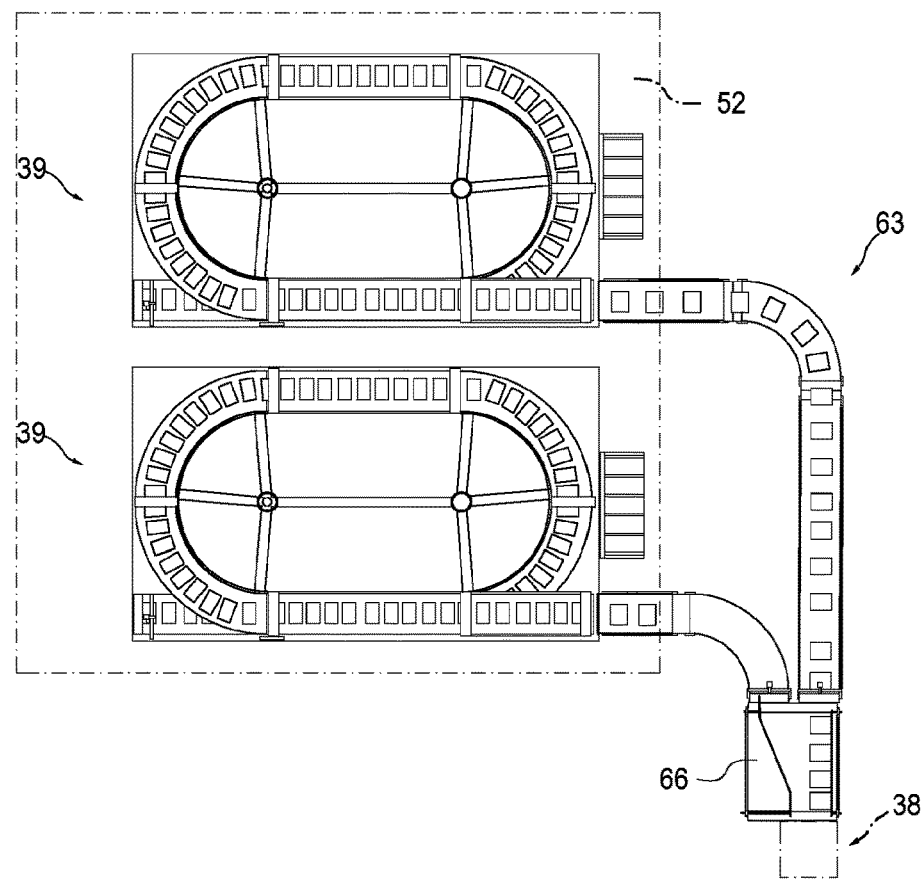
FIG. 6 shows a schematic plan view of other components of FIG. 1.

In the production plant 22, one or more forming stations 26 and/or one or more perfect binders 27 can each be connected to a pair of spiral towers 39, one of which is operative and another is in standby. To this end, intermediate dubbed conveyor belts 62 and 63 are provided (FIGS. 5 and 6) with two branches, which are coupled "in tandem", respectively, with the output gates 37 of the stations 26 and with the input gates 38 of the binders 27 through exchange conveyor mechanisms 64 and 66. The two branches of the conveyor belts 62 can be connected to the "tandem" towers lying in the loading area 49, while, respectively, the two branches of the belts 63 can be connected to the "tandem" towers lying in the unloading area 50.

With the use of the dubbed conveyor belts 62, the book block forming stations 26 can be connected with a pair of spiral towers 39 in the loading area 49, of which an operating tower is loading and an empty tower is waiting. In response to "full tower" information from the operating tower, the exchange mechanism 64 is switchable for directing the book blocks 32 toward the belt branch 62 connected to the waiting tower 39. The already waiting tower becomes operative and will begin to collect the book blocks 32, allowing an operator to replace the full tower with an empty one, without substantial slowing down in the forwarding of the book blocks formed by the station 26.

In turn, the dubbed conveyor belts 63 allow the perfect binders 27 to be connected in the unloading area 50 with a pair of spiral towers 39, of which an operating tower will be unloaded and a full tower will be waiting. In response to "empty tower" information of the operating tower, the exchange mechanism 64 is switchable to place the input gate 38 of the perfect binder 27 in connection with the branch of the belt 63 connected to the waiting tower 39. The already waiting tower 39 becomes operative and will forward the stored book blocks 32 toward the binder, allowing an operator to replace the empty tower with a full one, without substantial slowing down of the same perfect binder 27.

Each spiral tower 39 can load book blocks 32 of several working orders for feeding a book block with covers of the same working orders or for feeding multiple perfect binders with covers of the corresponding working orders.

The production plant 22 can employ a set of spiral towers 39 of different typologies with respect to the spacing of the coils, the storage capacity and the possibility of loading book blocks belonging to different working orders.

According to a feature of the invention, the server of the electronic center 29 can operate with a best tower program which suggests which tower is best for executing a given working order.

In summary, the best tower program proposes the solution optimized for the selection of spiral towers taking into account:

Distance between coils—to reserve towers having the largest coils of the spiral path to activities for incoming working order regarding books of high thickness;

Tower capacity—to select an empty tower having sufficient capacity to store all the book blocks of the incoming working order;

Residual capacity of the tower—to suggest a tower whose residual capacity is sufficient to store the book blocks of a full working order;

Use of the towers—to use the towers with operative rotation for a similar state of use; and Proximity of the tower—to select the nearest tower among all valid towers.

As regards the displacement capability, the spiral towers 39 are provided with easy displacement means.

Figure 7:
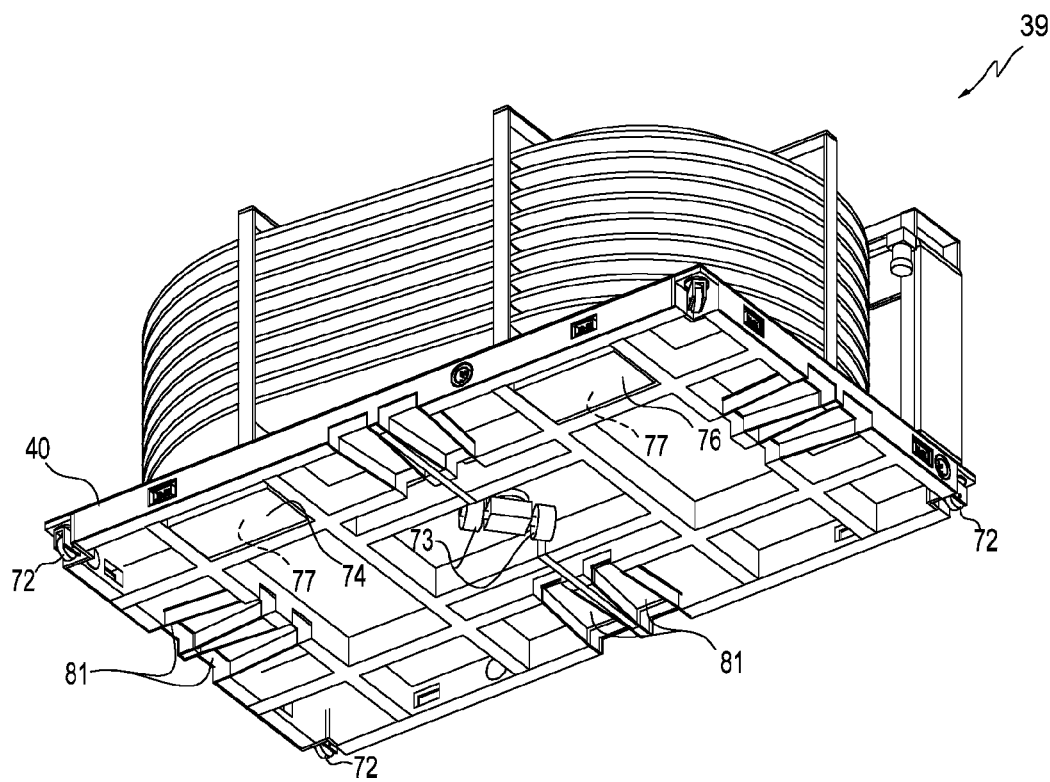
FIG. 7 is a schematic bottom view of the component of FIG. 2.
Figure 8:
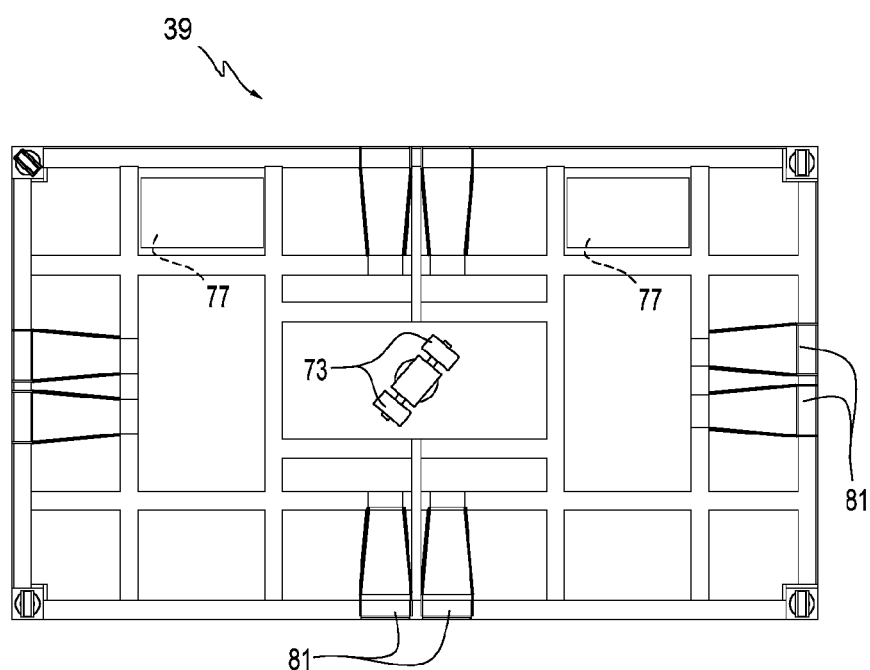
FIG. 8 is a plan view from below of the component of FIG. 2.

Specifically, in each tower 39, the platform 40, of substantially rectangular shape, is supported by four multi-directional wheels 72 (FIGS. 7 and 8) and a pair of swiveling wheels 73 mounted at the corners and in a central section, respectively. For some types of spiral tower, the platform 40 further comprises, in a lower section, two housings 74 and 76 in which batteries 77 are lodged. The swiveling wheels 73 are motorized with feeding from the batteries 77 to carry out easy movements of the towers among the loading areas 49, the unloading areas 50 and the parking areas 51.

Figure 3:
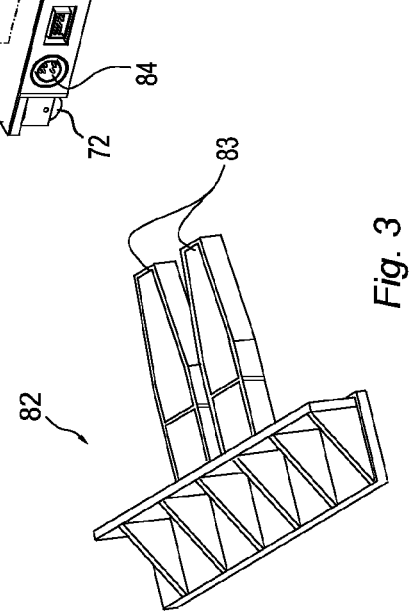
FIG. 3 is a schematic view of another component of the plant of FIG. 1.

The platforms 40 of the spiral towers 39 also define pairs of positioning seats 81 while anchoring blocks 82 (see FIGS. 1 and 3) are fixed in the loading areas 49 and the unloading areas 50. The blocks 82 have teeth 83 with profiles substantially complementary to those of the seats 81 for a stable and precise positioning of the towers 39 with respect to the forming stations 26 and to the binders 27. In the loading areas 49, the seats 81 of the platforms 40 can be coupled with the teeth 83 of the blocks 82, aligning the tower input 47 with the output gate 37 of the forming station 26 with locking of the tower. Similarly, in the unloading areas 50, the positioning seats 81 can be coupled with the teeth 83 by aligning the output of the tower 39 with the input gate 38 of the binder 27 and the locking of the tower.

In the platforms 40 there are electric sockets 84 (FIGS. 1, 2 and 3) connected to the motor 43 for moving the conveyor belt 42 and to a power supply for recharging the batteries 77. The sockets 84 can be connected to cables not shown of the book block forming stations 26 and of the perfect binders 27 for the operation of the towers in the loading areas 49 and 50. In the parking area 51, the sockets 84 can be connected for recharging the batteries 77 with one or more supply towers 86. Alternatively, the electrical supply of the towers 39 can be carried out, together with the physical connection between blocks 82 and towers, by means of electrical arrangement between the teeth 83 of the blocks 82 and the positioning seats 81.

The platforms 40 also include data sockets 87 connected to the electronic control units 44. The data sockets 87 can be connected to data cables not shown of the forming stations 26 and of the binders 27 for the exchange of information functional to the loading and unloading operations.

In a simplified form, the spiral towers 39 are not provided with autonomous movement features and their displacement capacity can be obtained by using the platforms 40 as pallets of one or more forklift trucks.

The spiral towers 39 can also load graphic blocks in automated publishing systems in different and/or subsequent working steps with respect to those of the assembly between book blocks and covers. This is the case, for example, of extra work on block books, such as wrapping, cutting, coating, etc. or in the case of "semi-bound" books for a rigid cover. For such work, the spiral tower can be loaded again with bookbound books.

The spiral towers 39 so far described and shown in FIGS. 1-8 are of an elongated type and in which the coils have in section two circular sectors connected with two straight portions. The height of the towers can be limited so as to obtain a facilitated coupling with the perfect binders and a good storage capacity.

Without this representing a limitation of the scope of the invention and purely by way of orientation, the spiral towers 39 have a width of 300 cm, a length of 450 cm and a height of 160 cm, for a distance of about 10 cm between the coils of the spiral path "SP".

Figure 9:
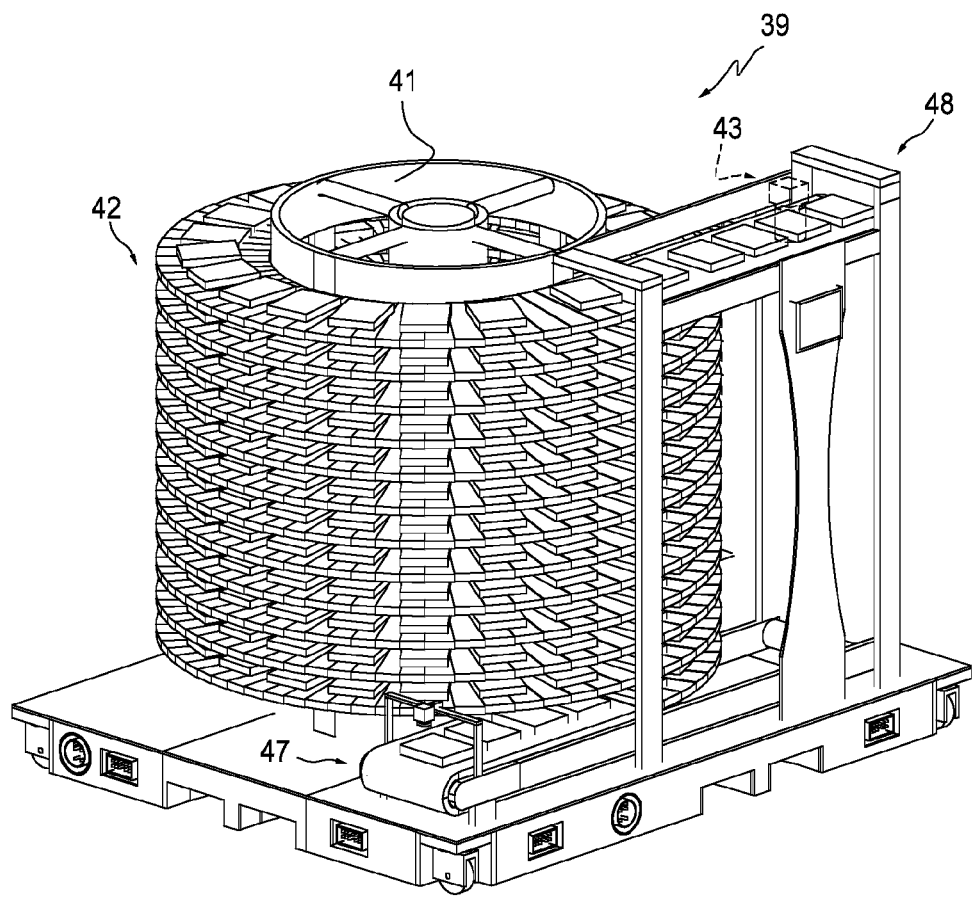
FIG. 9 is a schematic view of a variant of the component of FIG. 2.
Figure 10:
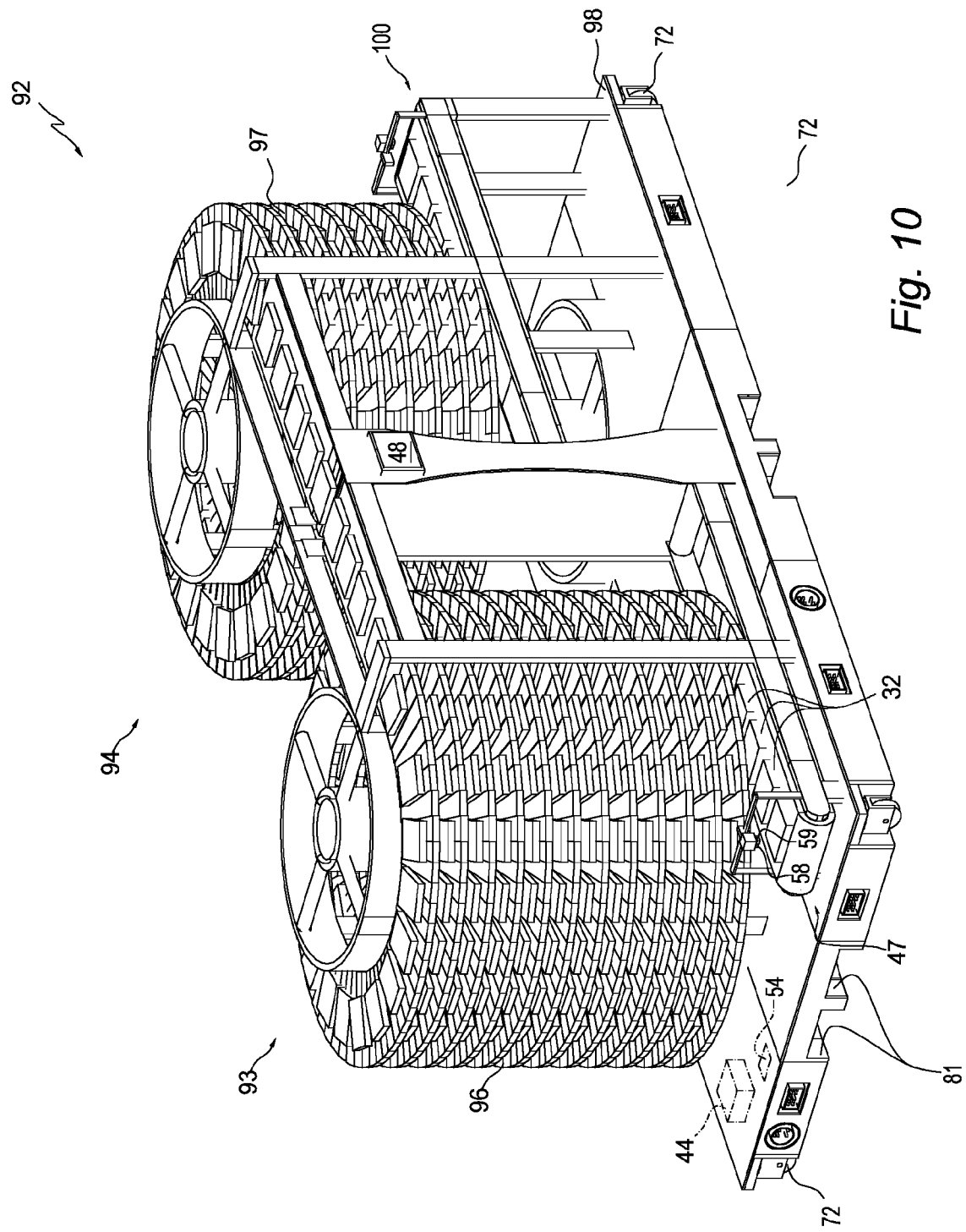
FIG. 10 is a schematic view of another variant of the component of FIG. 2.
Figure 11:
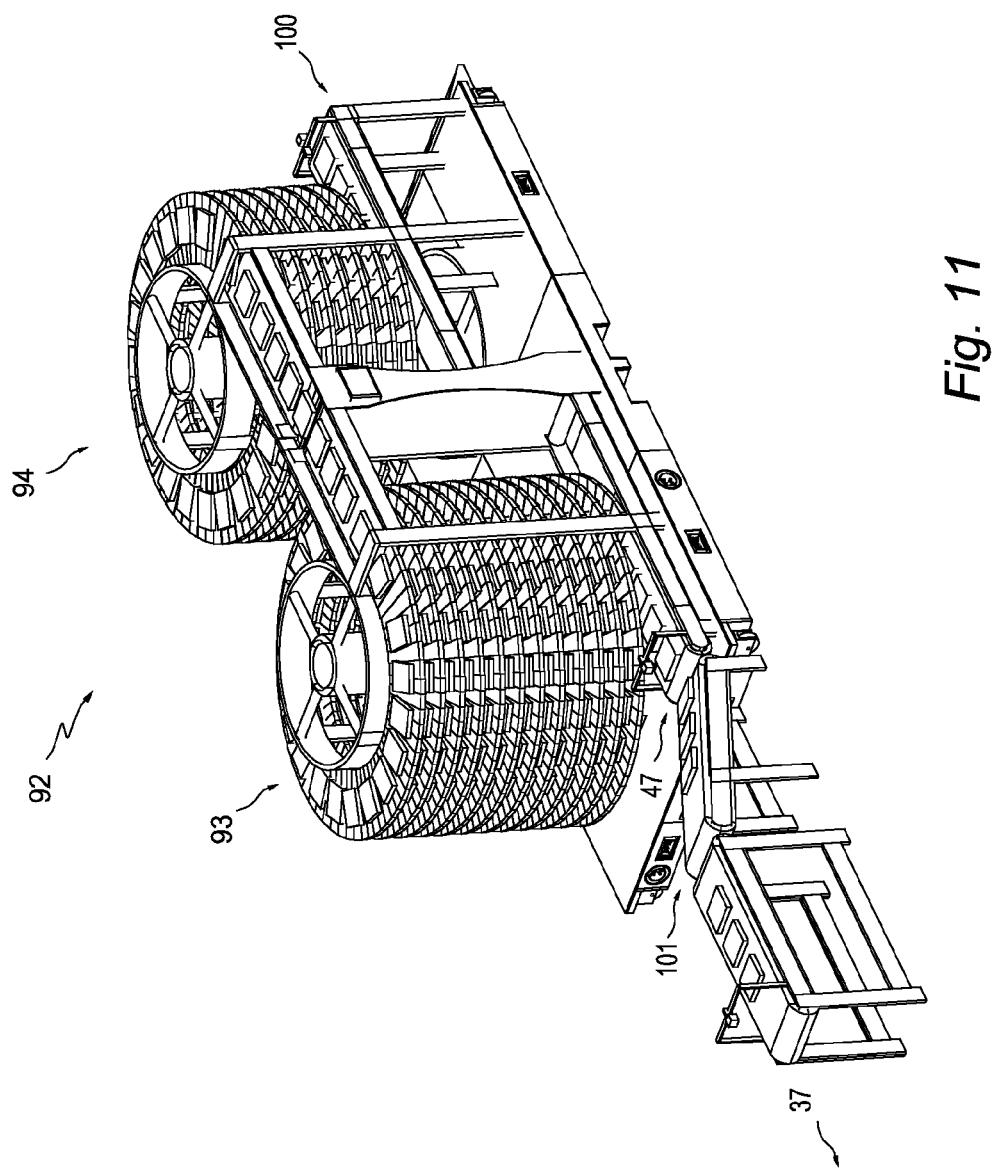
FIG. 11 shows a schematic view of some components of the plant of FIG. 1 with the variant of FIG. 10.
Figure 12:
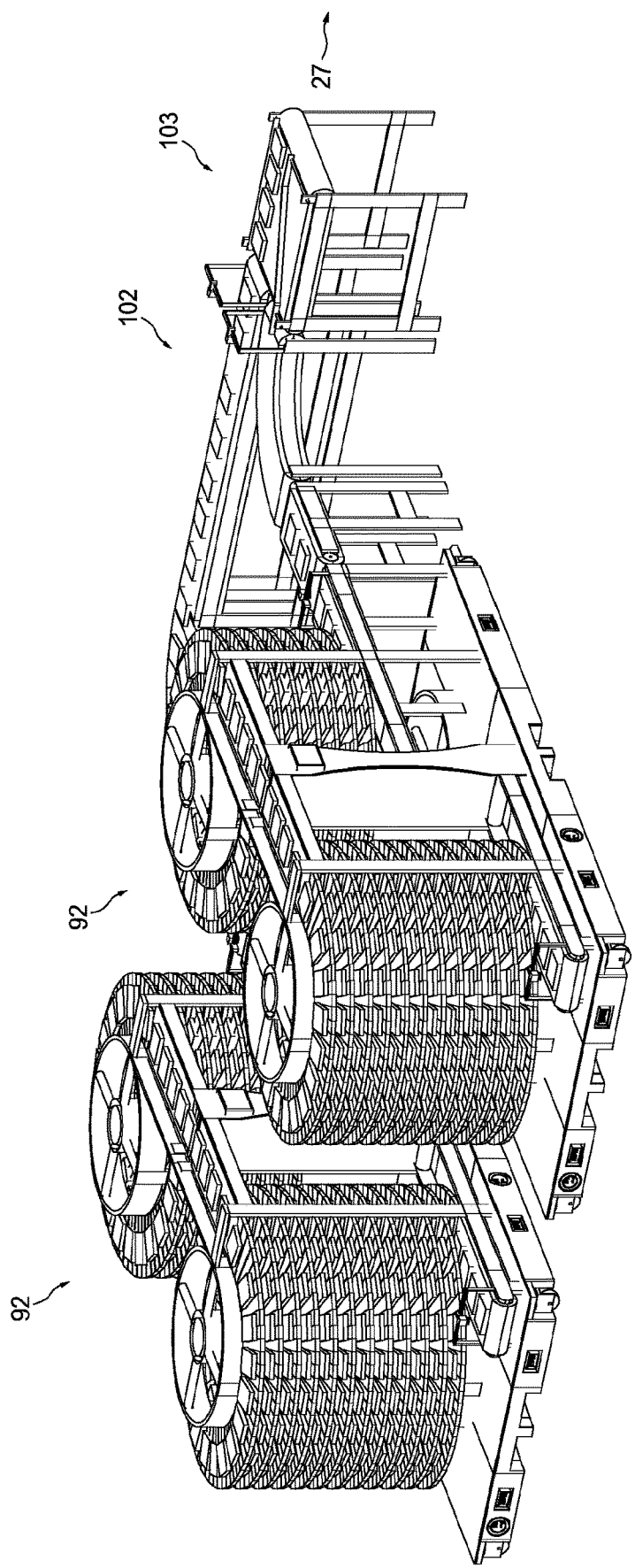
FIG. 12 shows another schematic view of some components of the plant of FIG. 1 with the variant of FIG. 10.

The production plant 22 may also use as accumulation and transport means, alternatively or in combination with the spiral towers 39, circular spiral towers 91 of FIG. 9 or double spiral towers 92 of FIGS. 10, 11 and 12.

The circular spiral towers 91 (FIG. 9) have a structure similar to that of the towers 39, but the coils of the spiral path have no rectilinear segments and are developed in height. Their use is generally connected to the output mode "LIFO", using the tower input 47 as the output gate of the book blocks 32, with the reversal of the direction of motion of the conveyor belts. Height and diameter of the towers 91 can be modulated according to the storage requirements.

The double spiral towers 92 (FIG. 10) each include two spiral towers 93 and 94 of which the tower 93 has a conveyor belt 96 with salient spiral and the tower 94 has a conveyor belt 97 with descendent spiral. The double tower 92 has a platform 98 similar to the platform 40 of the towers 39 and with output gate and functional components equal to those of the towers 39 and which maintain the same numbering.

The upper section of the conveyor belt 96 is connected to the upper section of the conveyor belt 97. The book blocks 32, after the tower 93 has been filled with a salient shifting through the tower input 47, are stored in the tower 94 with descendent shifting up to a tower output 100. The number of coils of the tower 94 can be limited so as to have the tower output 100 at the same height from the ground as the input gates 38 of the perfect binders 27.

In the double spiral tower 92, the conveyor belt recovery path 96 includes a vertical section descending from the uppermost portion and a horizontal section toward the tower input 47. The recovery path of the conveyor belt 97 includes a horizontal section from the tower output 100 and a vertical section salient from the horizontal section to the uppermost portion. The motorization groups for moving the conveyor belts 96 and 97 are suitably synchronized: when a book block arrives, with a salient shifting up to the upper portion of the conveyor belt 96, the block is received and dragged by the conveyor belt 97 with a descendent shifting up to the tower output 100. The overall spiral path of the tower 92, intended for storage of the book blocks, is therefore constituted by the salient spiral portion of the belt 96 and by the descending spiral portion of the belt 97.

The spiral towers 92 can be connected to the book block forming stations 26 by means of respective intermediate conveyor belts 101 (FIG. 11). The belts 101 are suitably inclined to compensate for different heights between the output gates 37 of the book block forming stations 26 and the tower inputs 47. For the connection of the spiral towers 92 with the perfect binders 27, the intermediate conveyor belt (not shown), on the other hand is substantially horizontal.

The double spiral towers 92 also have the possibility of being connected in "tandem" with the forming stations 26 and the binders 27 by means of a switching mechanism and a dubbed conveyor belt. FIG. 12 shows the "tandem" connection of two double spiral towers 92 with a dubbed conveyor belt 102 and a switching mechanism 103 for feeding a perfect binder 27.

The operation of the production plant 22, in its main parts, provides the pre-set for loading of an empty tower 39 (FIGS. 1 and 2) present in the loading area 49, by connecting the tower input 47 with the output gate 37 of the book block forming station 26 and interfacing the electronic control unit 44 with the forming station 26 for detecting synchronization information thereof.

Upon receipt at the tower input 47 of a book block 32 to be loaded, the optical reader 58 and the scanner 59 detect the characteristics of the book block and transmit them to the electronic control unit 44. On the basis of the "LP" loading program, the electronic unit 44 drives the motor 43 of the motorization group for incrementally moving the conveyor belt 42. This can occur with a minimum spacing with respect to a book block previously loaded or scaled along the conveyor belt, with a substantially constant degree of overlapping, independently of thickness and size of the book blocks.

The book blocks 32 are loaded, one after the other, until the loading is completed for a given working order or, when this is not possible, until the tower is filled. In accordance with instructions from the electronic center 29, for use with a single tower, the operator disconnects and moves the full tower away from the output gate 37 and prepares for loading, connecting it to the door 27, an empty tower already present in the loading area 49 or moving it in this area from the parking area 51 or from one of the unloading areas 50.

Following the instructions of the electronic center 29, the operator then shifts the full tower of the loading area 49 into the unloading area 50 of the perfect binder 27 as indicated in the working order or in the parking area 51.

For assembly between book blocks and covers, the operator must prepare for unloading the full tower already present in the unloading area 50 or after having picked up and positioned the designated tower from the parking area 51. This, by connecting the tower output to the input gate 38 of the perfect binder 27 and interfacing the electronic control unit 44 with the binder 27 for an exchange of information.

On the basis of a request by the perfect binder 27, of the unloading program "UP", the information from the output reader 61 and the matching between the book code 34 and the cover code 36, the electronic unit 44 activates the motor 43 of the motorization group. For the feeding the binder 27, the book blocks are removed from the minimum distance or scaled arrangement with incremental movement of the conveyor belt 42. This is based on the book block information and information from the output optical reader 61.

According to the working order, the book blocks 32 are unloaded in succession until the tower is emptied. In the case of a single tower, the operator disconnects and moves the full tower away from the input gate 38 and can now arrange for unloading a full tower present in the unloading area 50 or by moving it from the parking area 51 or from the loading area 49. The emptied tower present in the unloading area 50 can be moved into the loading area 49 or into the parking area 51.

In the case of use of "tandem" towers 39, the loading and unloading operations are simplified and accelerated for the exchanges between operating towers and waiting towers made possible by the switching mechanisms 64 and 66.

The operation of the towers 91 and of the towers 92, with the modifications of the case, is quite similar to that of the towers 39 and, for brevity, has been omitted.

Naturally, the principle of the invention remaining the same, the embodiments and details of construction may be varied widely with respect to what has been described and illustrated purely by way of non-limiting example, without thereby departing from the scope of the present invention.

In particular, the intermediate conveyor belts 52 between the book block forming stations 26 and the spiral towers 39, 91 and 92 may be constituted by buffer conveyor belts (not shown) or be integrated with such belts. Under normal operating conditions, the buffer belt moves at a speed higher than that of the tower conveyor belt. Due to slowing down or stopping of the tower, the buffer strip slows down, temporarily accumulating the blocks and returns to the steady speed upon restoring normal operating conditions. If the buffer strip is full and the tower has not been reactivated, the forming station is also stopped.

The buffer conveyor belts can also be combined with the dubbed conveyor belts 62 for "tandem" towers. Thus, the buffer belts can retain the book blocks intended for a fully charged tower, in view of the subsequent deviation of the book blocks toward the empty tower, without stopping the forming station 26.

The spiral towers 39, 91 and 92 can also be loaded manually. The "LP" loading program will measure the book for an optimized advancement of the tower conveyor belt, with the possibility for the operator to overwrite the values. The operator can also cause the input optical readers 58 to read the book code 34 also in manual mode, without the processing of the "LP" program. The display 46 will show the same information shown for automatic loading based on the stated values.

Finally, the towers can be connected in a chain. A second spiral tower can be loaded with a last part of a work stored in the first tower and will be interlocked with the preceding tower.

The invention claimed is:

1. A plant for the production of books printed with digital technologies comprising one or more book block forming stations, one or more cover binding machines for assembling book blocks with respective covers, and accumulation and transport means for receiving the book blocks supplied by the book block forming stations and transferring the book blocks to the cover binding machines, and wherein the book blocks have corresponding graphic book codes while the covers have respective cover codes associated with the respective graphic book codes of a given working order, wherein:

said accumulation and transport means comprise a plurality of spiral towers, wherein each spiral tower has a conveyor belt that can be moved along a multi-level spiral path, a belt moving group, and an electronic control unit for the belt moving group;

each spiral tower has a function of temporary storage for the book blocks along the spiral path and capability of movement between loading areas adjacent to the book block forming stations and unloading areas adjacent to the cover binding machines and wherein the electronic control units, in the loading areas, can set up the towers for receiving and storing in an orderly way along the conveyor belt the book blocks from the book block forming stations, while, in the unloading areas, the electronic units can set up the spiral towers for feeding the cover binding machines with the stored book blocks;

the electronic control units are provided for obtaining and storing databases of identification for the stored book blocks; and said plant has an electronic center with a server, interfaced with the electronic control units of the spiral towers and the cover binding machines for taking charge loading data and for a functional coupling of the loaded spiral towers with the cover binding machines jointly with the working order.

2. The plant for the production of books according to claim 1 wherein the forming stations or the spiral towers comprise one or more optical detection devices for detecting at a tower input identification data of the book blocks to be stored by reading of the book codes; and wherein the electronic control units can store the number of books present together with the identification data as a database of the loaded book blocks.

3. The plant for the production of books in accordance with claim 2, wherein each spiral tower provides a display and a load optimization program, wherein the electronic control unit is configured for scanning the graphic book code, forming a file containing working order information and loading the display with the working order information and a total amount of book blocks that said spiral tower can store, and wherein the electronic control unit can respond to a book block received on the conveyor belt and a respective scanned book code for causing the conveyor belt to be moved incrementally so as to arrange the book blocks with optimized spacing along the belt and arresting the conveyor belt on detection of a book block on a terminal section of the tower and wherein said control unit can respond to information from the book code of an emerging book block by releasing the book blocks in a slave mode, on request of the cover binding machine, loading the display with updated information and arresting the conveyor belt upon delivering of a last stored book block.

4. The plant for the production of books according to claim 1 wherein each spiral tower can load the book blocks of more working orders for feeding a cover binding machine with covers of the same working orders or for feeding more cover binding machines with covers of the corresponding working orders.

5. The plant for the production of books in accordance with claim 1 wherein each spiral tower is equipped with a localization device, the data between the towers and the electronic center can be exchanged via a wi-fi connection and wherein said plant further includes a series of gate sensors and antennas to allow the electronic center to know the position of each spiral tower, close to which area, for an easy retrieval of a tower to be used.

6. The plant for the production of books according to claim 1 wherein the spiral path extends from an initial section to a terminal section of each spiral tower, wherein the initial section and the terminal section, respectively, define a tower input and a tower output for the book blocks, said electronic control unit can be set up for moving the conveyor belt in both directions, and wherein the book blocks can be unloaded: directly, from the tower output to the cover binding machine and, in an inverted way, from the tower input to the binding machine and/or for additional unloading functions.

7. The plant for the production of books in accordance with claim 1, wherein the spiral towers define coils of the conveyor belts spaced apart each the other and are of different typologies with regard to spacing of said coils, different storage capacities, and can load book blocks of several working orders, and wherein said electronic center can operate with a best tower program which suggests the best tower for a given working order, by taking into account:

belt height—for reserving spiral towers in which said coils are spaced apart for incoming working orders with thick book blocks;

tower capacity—for selecting an empty spiral tower capable of storing book blocks of a full working order;

residual tower capacity—for suggesting a spiral tower whose residual capacity is sufficient to store the book blocks of a full working order;

use of towers—for using spiral towers with operational rotation of a similar state of use; and nearest tower—for selecting a closest spiral tower among all valid spiral towers.

8. The plant for the production of books in accordance with claim 1, wherein one or more book block forming stations and/or one or more cover binding machines are connected at respective inputs and outputs with dubbed and switchable conveyor belts, which in turn can be coupled in tandem, respectively, with an operational spiral tower in the loading area and a waiting spiral tower, and wherein, in the loading area and in response to a "full tower" information of the operational tower, a dubbed and switchable conveyor belt can be switched to direct the book blocks to the waiting spiral tower which will start to collect the book blocks and the possibility of replacing a full tower with an empty one, and wherein, respectively, in the unloading area and in response to an "empty tower" information of the operating tower, the dubbed and switchable conveyor belt can be switched for feeding the cover binding machine with the book blocks of the waiting tower and the possibility of replacing an empty tower with a full tower.

9. The plant for the production of books according to claim 1, wherein, in use, the plant comprises a parking area for spiral towers, in preparation of movements of towers in a full loading configuration to the unloading areas and in preparation of movements of empty towers to the loading areas.

10. The plant for the production of books according to claim 1, wherein the plant comprises buffer conveyor belts inserted between the book block forming stations and the spiral towers for accumulating book blocks in the event of slowing down or temporary stopping of the spiral towers and for releasing the accumulated blocks when the spiral towers return to normal operating conditions.

11. A method of producing books printed with digital technologies with a plant according to claim 1, wherein said method provides the steps:

a) setting up for loading a spiral tower in the loading area, by connecting an input of a spiral tower with an output from the book block forming station and interfacing the electronic control unit with the forming station and the server;

b) receiving a book block to be loaded at the input of the spiral tower and, through optical detection devices, detecting information on characteristics of the book block with transmission to the electronic control unit and updating of the database;

c) activating, via the electronic control unit and on the basis of a loading program, the belt moving group for moving the conveyor belt so as to arrange the book blocks in an optimized way along the conveyor belt independent of the size of the block book;
d) repeating steps b) and c) until completing the loading of the book blocks on the conveyor belt of the spiral tower and setting up an empty spiral tower already present in the loading area for loading or moving to the loading area an empty tower from the parking area or from the unloading area;
e) moving a loaded spiral tower present in the loading area to the unloading area or the parking area;
f) setting up a full spiral tower present in the unloading area for unloading, by connecting an output of the full spiral tower with an input of the cover binding machine and interfacing the electronic control unit with the binding machine to exchange information;
g) activating, via the electronic control unit and on the basis of an unloading program, the belt moving group for moving the conveyor belt in order to feed the cover binding machine with the book block removed from the belt;
h) repeating step g) until completing the unloading of the book blocks from the full spiral tower and setting up another full spiral tower already present in the unloading area for unloading or moving said other full spiral tower from the parking area or the loading area; and
i) moving emptied spiral towers present in the unloading area to the loading area or the parking area.

12. A production plant for book on-demand comprising a book block forming station or more book block forming stations, a cover binding machine or more cover binding machines for assembling the book blocks with respective covers, and accumulation and transport means for receiving the book blocks supplied by the book block forming station or by one of the book block forming stations and transferring the book blocks to the cover binding machine or to a corresponding cover binding machine, wherein:
the accumulation and transport means comprise a plurality of spiral towers and wherein each spiral tower includes a conveyor belt that can be moved along a spiral path, a belt motorization group, and an electronic control unit for the motorization group;
each spiral tower has the function of a temporary storage for the book blocks along the spiral path and capability of movement between a loading area adjacent to the book block forming station or each book block forming station and an unloading area adjacent to the cover binding machine or each cover binding machine and wherein, in the loading area, the spiral tower is designed for serially receiving and storing the book blocks from the book block forming station while, in the unloading area, the spiral tower is designed for feeding the cover binding machine with stored book blocks;
the electronic control unit, on the basis of a loading program, can respond to information from the book block forming station and information on dimensional characteristics of a book block emerging from said book block forming station for driving the belt motorization group with movement of the conveyor belt such as to arrange the book blocks in an optimized way along the spiral path of the belt, regardless of the size and the time of formation of the book block; and
wherein said electronic control unit, on the basis of an unloading program, can respond to information from the cover binding machine and information on the characteristics of an emerging book block for moving the conveyor belt so as to feed said cover binding machine with the emerging book block.

13. The production plant for the production of books according to claim 12, wherein the electronic control unit, on the basis of the loading program, can drive the belt motorization group for an intermittent movement of the conveyor belt with optimized distance arrangement of the book blocks along the conveyor belt, or scaled with partial overlap, in a substantially constant manner independent of the size of the book blocks.

14. The production plant for the production of books according to claim 12, wherein the production plant comprises one or more optical detection devices and relative controllers on the book block forming station or on each tower for detecting identification data of the book blocks to be accumulated by reading of graphic book codes of the book blocks, and wherein the electronic control unit can store the number of book blocks present together with said identification data as a database of the loaded book blocks and wherein said database is updated in response to the removal from the spiral tower of book blocks to be bound.

* * * * *